Patented Dec. 6, 1949

2,490,069

UNITED STATES PATENT OFFICE 2,490,069

GEL FORMING DRILLING FLUID

Benjamin S. Lindsey, Houston, Tex., assignor to The Milwhite Company, Incorporated, Houston, Tex.

No Drawing. Application December 22, 1941, Serial No. 423,953

11 Claims. (Cl. 252—8.5)

This invention relates to the treatment of barium sulphate in order to prepare it for use as an admix in drilling muds.

As ordinarily mined barium sulphate is in an impure state containing silica and other impurities which it is desirable to remove. It has been found that the separation of the impurities can best be accomplished after the ore has been ground. This separation may be carried out by various processes but the particular process to be here considered is known as a froth flotation process wherein a flotation reagent is added to the wet mix of the ground ore.

The present invention particularly directs itself to the effect of these flotation reagents upon the product of the flotation. The flotation reagents usually employed are fatty acids and resin acids.

The flotation reagents leave a residue or coating on the surface of the particles of barium sulphate. This coating must be destroyed or removed in order to cause the barium sulphate to be wettable in the drilling mud.

The present process and product relates to the destruction by roasting of this coating or residue on the surface of the particles of material.

The present invention further relates to the reactions which occur due to the roasting and it is believed that the roasting of the barium sulphate particles results in a mixture of barium sulphate and certain soluble barium compounds such as barium oxide, barium carbonate and barium sulphites, so that the composition of the barium sulphate is somewhat changed by the roasting.

The present invention is also related to the effects produced in the drilling mud due to the introduction of these barium compounds into the drilling mud.

It has been found that the introduction of these soluble barium compounds into a drilling mud containing bentonite, and most drilling muds either contain bentonite or have it added thereto, results in the formation of barium bentonite.

The bentonite in the drilling mud provides certain gel characteristics which are desirable in order to facilitate drilling and to cause the drilling mud to be a suitable carrier for the cuttings and the mud heaviers such as barium sulphate.

The formation of barium bentonite in the drilling mud or its presence in the mud is objectionable because barium bentonite does not have suitable gel or thixotropic properties and has a tendency therefore to cause the drilling mud to release heavier particles of weighting materials and to permit the settling of such materials and the cuttings from the mud.

The present invention also contemplates the compounding with the barium mixture from the roasting process of a suitable inhibitor which will tend to prevent the formation of barium bentonite. It has been found that inorganic sulphates may be used as inhibitors.

It is one of the objects of the invention to effect the roasting of the product of flotation in such a manner as to produce a minimum of soluble barium compounds while maintaining a suitable pH value (hydrogen ion concentration).

Another object of the invention is to combine a barium mixture which is the result of a flotation and roasting process with an inorganic sulphate inhibitor so as to prepare it for use as an admix for drilling muds.

Still another object of the invention is to provide an admix for drilling muds which is inhibited against the formation of barium bentonite.

Still another object of the invention is to treat a drilling mud which contains barium bentonite with a material so as to restore the thixotropic properties to the bentonite.

Another object of the invention is to provide a barium laden drilling fluid possessing desired thixotropic properties such that drilling operations are facilitated.

Another object is to prevent the formation of a non-gelling barium bentonite in a drilling fluid containing bentonite when a barium sulphate as a heavier is added.

Another object of the invention is to provide a mud heavier comprising a barium mixture and an inhibitor.

Another object is to provide a drilling material capable of reconverting barium bentonite to a type having gel or thixotropic properties after barium bentonite has been formed in the suspension material.

Other and further objects of the invention will be readily apparent when the following detailed description is considered.

In order to set forth the entire process of treating barium ores it may be stated that the raw ore may be first wet ground and then classified to permit the wet grinding operations to provide proper particle size of the ore so that an efficient separation is to be had in the flotation process.

This grinding operation may be performed in one or more steps and the classification also carried out by a plurality of steps and if desirable may include a liquid classification. The grinding and classification steps may be alternated.

From the classification the mix or slurry passes to a conditioner where the flotation reagents are added. The reagents may include higher fatty acids or resin acids together with crude oil and conditioning chemicals such as sodium silicate, sodium carbonate or sodium hydroxide.

A certain amount of agitation is desired in the conditioner so as to obtain a thorough mixing of the material with the reagents and to provide a time element for conditioning. The flow through the conditioner is preferably continuous or at such a rate when the size of the equipment is considered so that the materials will be in association for a suitable length of time to obtain the desired amount of conditioning.

From the conditioner the mix is passed to a series or battery of flotation cells. These flotation cells may be furnished in various combinations so that the mix may be recycled through some of the cells with a view of obtaining as complete a separation of the barium sulphate from its impurities as possible.

In this flotation process the froth carries the barium sulphate particles off by froth flotation; whereas the impurities flow out with the water or carrier liquid. Obviously the arrangement, disposition and connection of these flotation cells will depend upon the size, capacity and rate of operation of the plant.

The flotation product passes from the flotation cells as a concentrate and is delivered to a thickener for the purpose of removing some of the water which has been carried over with the froth. The product of the thickener then passes to a filter where the product is again subject to the removal of water.

The material from the filter is then passed to a combination drier and roaster which is preferably in the form of a rotary kiln. The roasting operation is of particular importance because it has been found that each of the particles of barium sulphate entering the drier and roaster carries with it a coating of the flotation reagents and as pointed out heretofore, this coating is objectionable because it prevents the particle of barium sulphate from becoming wetted with water when it is introduced into the drilling mud.

The roasting step of the process must be carried out at a suitable temperature such that coating is destroyed. In other words the drying and roasting must be carried on at such a temperature and for such a period of time as will cause the destruction of the coating of the reagent material.

In order to accomplish this roasting process in the rotary kiln it must be carried out in the presence of oxidizing gases and in the absence of any flame which would cause ignition of the coating material when it is heated to the roasting temperature because it has been found that too high a temperature or too long a roasting period or the ignition of the coating material causes decomposition reaction of the barium sulphate which results in the formation of soluble barium compounds.

The roasting kiln is therefore of a particular construction from a fire box basis so that the flame is deflected by a suitable baffle assembly and is dissipated before actually entering the kiln, or before coming in contact with the material. On the other hand, however, the gases must be at a suitable temperature and contain an excess of air so as to conduct sufficient oxygen into the kiln to effect a destruction of the film on the particles without decomposition of the barium sulphate. Thus, the more oxygen there is present in the kiln, the less will be the decomposition tending to form soluble barium compounds.

In the roasting process it has been found that if the temperature and the period of roasting are sufficient to eliminate the reagent coating, that there is some reduction of the barium sulphate to the various soluble barium compounds and that therefore the roasting process must be controlled so as to obtain a product which will be wettable by water on the one hand and will contain a minimum of soluble barium compounds on the other hand. Presence of the soluble barium compounds affects the pH value of the product and therefore the pH value of the product is an indication of the amount and type of the soluble barium compounds which are formed and present.

The control in the roasting process may therefore be governed by a control of the pH value. If the pH value is below the neutral value of 7, it is an indication that the sulphites are being formed; whereas, if the pH value is above 7, it indicates a greater formation of oxides.

This control of the pH value can be accomplished by the variation of the temperature and the time of roasting.

By suitable control of these factors a product is obtainable which has as desirable characteristics as it has been found possible to obtain.

The introduction of the product thus far obtained into a drilling mud has been found to cause the formation of barium bentonite. It is desirable to avoid the formation of barium bentonite or to restore the bentonite to its original thixotropic condition in a drilling mud if it has already been formed.

It is believed that some explanation of the phenomena which occurs in drilling muds is desirable and the following explanation is therefore presented in order to provide a background for the solution of the problem of avoiding the existence of barium bentonite in the drilling mud.

In the drilling of wells, particularly by the rotary method, it is desired that certain characteristics may be maintained in the circulating mud laden fluid. One important characteristic the fluid must have is the ability to form a gel so that suspended materials will not settle back in the bore hole. These materials may be mud heaviers and cuttings.

It is common practice to use bentonitic clays in drilling fluids and it is well known that the thixotropic or gelling properties and swelling of a bentonite are dependent upon the ions which are present adsorbed to the clay surface. The phenomenon of gelling is attributed to a combination of factors resulting from the presence of these ions. One factor is the formation of a charge on the surface of the clay particle which causes repulsion between individual particles. Another factor is the hydration of the ions. This latter factor explains the fact that different bentonites having identical crystal structures, particle sizes, etc. show different degrees of swelling and different gelling properties. It is known that a given bentonite can be converted into different forms merely by replacing the adsorbed ions with ions that are different. Experimental evidence shows that the degree of swelling and the extent to which gelling manifests itself is in the same order as the hydration and degree of ionization of the ions which are present.

For example if a Wyoming bentonite is electrodialyzed the naturally occurring sodium, potassium, and calcium ions are removed and replaced by hydrogen. The resulting hydrogen bentonite does not swell after being dried and placed again in water. If the sodium ions are returned to the hydrogen clay, it regains its former properties of swelling and gelling. If barium ions are put on the clay to replace the hydrogen, the clay does not become of the swelling type and does not show the property of gelling. This shows that the slightly hydrated hydrogen and barium ions produce a non-gelling type of clay. Since these ions have a small amount of water of hydration associated with them they naturally can come into closer contact with the clay, and hence, give a lower degree of ionization. If excess amounts of electrolytes are used in the base exchange processes coagulation results due to this excess and the clay becomes flocculated, in which case the clay appears to be gelled. However, many effects show that in this case true gel does not exist.

In cases where high underground pressures are encountered weighting materials must be added to the clay base muds to increase the specific gravity so that the hydrostatic pressure of the mud column is as great or greater than the encountered pressure. A material widely used for this purpose is barium sulphate. The material added, however, preferably should be inert so as not to alter appreciably the other characteristics of the mud.

The formation of barium bentonite can be inhibited by adding an inhibitor such as a suitable inorganic sulphate as, for example, a small amount of strontium sulfate or celestite to the barium sulfate or barium mixture, before it is incorporated in the bentonite mud. If the barium bentonite is already present in mud the strontium sulfate may be added to the mud itself to accomplish the same purpose. The inhibiting action is probably due to the fact that the strontium hydroxide is quite insoluble as compared to that of barium hydroxide whereas barium sulphate is materially less soluble than strontium sulphate.

The least soluble of these materials formed from the combination will leave solution or precipitate producing a mixture free of both strontium and barium ions so that a barium bentonite cannot be formed. The presence of a suitable inorganic sulphate prevents the formation or existence of barium bentonite. If a barium bentonite has been formed before the inorganic sulphate is added, then the sulphate acts as indicated to precipitate the hydroxide of the sulphate and barium sulphate, allowing the ions which were originally on the clay to return to the clay and restore it to its original condition. These ions replaced on the clay, such as sodium and potassium, remain in the solution associated with the clay even though the barium is actually on the clay surface. This explanation of the phenomena described above appears to be a correct explanation. However, it is to be understood that it is not intended that the proposed explanation shall constitute a limitation of the invention but is offered merely to clarify the disclosure. The strontium ion is more hydrated than the barium ion and an excess will not cause as great a reduction in gel strength.

The following is a typical example of the present invention:

*Effect on Wyoming bentonite of barium sulphate $BaSO_4$ contaminated with soluble barium compounds*

1. 6% Wyoming bentonite in distilled water completely hydrated.
2. Added 340 grams of the contaminated barium sulphate to 500 grams of the gel fluid.

| Time factor hours room temperature | 10 min. gel factor as measured with Stormer viscosimeter |
|---|---|
| | Grams |
| 0 | 35 |
| 22 | 4 |
| 50 | 2 |
| 75 | 1 |

This same barium mixture after being compounded with a small amount of celestite or crude strontium sulphate was added to a similar sample of bentonite mud. As can be seen from the following data, the gel strength of the mud was not appreciably altered:

1. 6% Wyoming bentonite in distilled water completely hydrated.
2. Added 340 grams of contaminated barium sulphate, treated with ¾% celestite ($SrSO_4$) to 500 grams of the gel fluid.

| Time factor no heat room temperature, hours | 10 min. gel factor as measured with Stormer viscosimeter |
|---|---|
| | Grams |
| 0 | 35 |
| 24 | 30 |
| 48 | 35 |
| 72 | 40 |
| 96 | 35 |

The following inorganic sulphates are suitable as inhibitors:

| Material | Solubility in cold water (15–25° C.) (grams/100 grams of water) | Material | Solubility in cold water (15–25° C.) (grams/100 grams of water) |
|---|---|---|---|
| $CaSO_4$ | $2.0 \times 10^{-1}$ | $Ca(OH)_2$ | $1.76 \times 10^{-1}$. |
| $Al_2(SO_4)_3$ | 26.7 | $Al_2(OH)_3$ | Insoluble. |
| $Bi_2(SO_3)_3$ | Decompose | $Bi(OH)_3$ | Do. |
| $CdSO_4$ | 76.7 at 0° C | $Cd(OH)_2$ | $2.6 \times 10^{-4}$. |
| $Co_2(SO_4)$ | Decompose | $Co(OH)_3$ | Insoluble. |
| $CoSO_4$ | 26.2 at 3° C | $Co(OH)_2$ | Do. |
| $Cr(SO_4)_3 \cdot 18H_2O$ | 120 | $Cr(OH)_3$ | Do. |
| $CuSO_4$ | 20 at 0° C | $Cu(OH)_2$ | Do. |
| $Fe_2(SO_4)_3$ | Slt sol | $Fe(OH)_3$ | Do. |
| $FeSO_4 \cdot 7H_2O$ | 32.8 at 0° C | $Fe(OH)_2$ | $6.7 \times 10^4$. |
| $MgSO_4$ | 26.9 at 0° C | $Mg(OH)_2$ | $9.0 \times 10^{-4}$. |
| $MnSO_4$ | 53.2 at 0° C | $Mn(OH)_2$ | Insoluble. |
| $SrSO_4$ | $1.14 \times 10^{-1}$ | $Sr(OH)_2$ | .41. |
| $SnSO_4$ | 18.9 | $Sn(OH)_2$ | Insoluble. |
| $ZnSO_4$ | 43.02 at 0° C | $Zn(OH)_2$ | $4.2 \times 10^{-4}$. |
| $Zr(SO_4)$ | Soluble | $Zr(OH)_4$ | $2.0 \times 10^{-2}$. |

Since the enumerated sulphates are for the most part quite soluble, some care must be used so that only enough of the material is added to react with the soluble barium salts and no more; otherwise, the flocculating effect of excess electrolyte may cause difficulties.

In accordance with the invention the addition of sulphates which form insoluble hydroxides in water solution are effective in maintaining a thixotropic condition in bentonite clay fluids when soluble barium compounds are present.

The inorganic sulphates listed form hydroxides which are insoluble to the extent that they can be used to overcome the effect of the barium ion.

The inorganic sulphates listed which are considered as commercially applicable are aluminum sulphate, copper sulphate, ferric and ferrous sulphate, magnesium sulphate, strontium sulphate, zinc sulphate. Following are tests using several of the commercial inorganic sulphates to show their effectiveness:

1. 7% Wyoming bentonite, in distilled water completely hydrated.
2. Added 150 grams contaminated barium sulphate.

| Time factor, hours | 10 min. gel factor as measured in the Stormer viscosimeter |
|---|---|
| | Grams |
| 0 | 60 |
| 24 | 2 |
| 48 | 2 |
| 72 | 0 |

3. Added to 1 and 2 mixture ¼% pure strontium sulphate.

| Time | 10 min. gel |
|---|---|
| 0 | 75 |
| 24 | 25 |
| 48 | 20 |
| 72 | 5 |

4. Added to 1 and 2 mixture ½% pure strontium sulphate.

| Time | 10 min. gel |
|---|---|
| 0 | 115 |
| 24 | 85 |
| 48 | 72 |
| 72 | 50 |

5. Added to 1 and 2 mixture .04% aluminum sulphate.

| Time | 10 min. gel |
|---|---|
| 0 | 150 |
| 24 | 30 |
| 48 | 20 |
| 72 | 10 |

6. Added to 1 and 2 mixture ¼% magnesium sulphate.

| Time | 10 min. gel |
|---|---|
| 0 | 250 |
| 24 | 200 |
| 48 | 220 |
| 72 | 190 |

7. Added to 1 and 2 mixture .013% ferric sulphate.

| Time | 10 min. gel |
|---|---|
| 0 | 70 |
| 24 | 60 |
| 48 | 50 |
| 72 | 55 |

It may be noted from data presented that the more soluble inorganic sulphates react promptly and require a lesser amount of chemical, as a result there is some flocculating effect together with barium ion exchange to maintain the necessary thixotropic condition. Ferric sulphate and strontium sulphate are insoluble comparatively and as a result accomplish their purpose more effectively.

In using the inorganic sulphates there is no appreciable change in alkalinity that would have any effect in stabilizing the bentonite.

What is claimed is:

1. In the art of manufacturing heaviers for bentonitic drilling mud suspensions the steps of reducing impure barium sulphate to finely divided form, removing impurities therefrom by flotation of the barium sulphate from the impurities, roasting the remaining material to an elevated temperature to remove the flotation reagents and render the material wettable, then adding an inorganic sulphate inhibitor which tends to form insoluble hydroxides so as to avoid the formation of barium bentonite when the heavier is added to a bentonitic drilling mud.

2. In the art of manufacturing an admix for drilling muds the steps of, reducing barytes or impure barium sulphate to a finely divided form, removing therefrom by flotation inert materials of low specific gravity, heating the remaining material to remove flotation reagents, and thereafter adding an inorganic sulphate capable of forming insoluble hydroxides.

3. In the art of compounding drilling muds, the step of adding to finely divided mixture of barium sulphate and soluble barium compounds as impurities, an inorganic sulphate capable of forming insoluble hydroxides.

4. In the art of compounding a drilling mud the step of adding to a bentonitic colloid forming agent and a suspendable barium sulphate base, a quantity of an inhibitor of the inorganic sulphate type which forms insoluble hydroxide to prevent the formation of barium bentonite.

5. In the art of drilling oil and gas wells the method comprising the steps of introducing into the well a mud-laden fluid containing soluble barium compounds and including a gel-forming material of the bentonitic type, and adding thereto an inorganic sulphate which tends to form insoluble hydroxides so as to maintain the gel-forming properties of the fluid.

6. A process of preparing an impure barium sulphate for use as an ingredient in drilling muds which comprises, grinding the material, purifying the material by froth flotation with a higher fatty acid reagent, removing the coating on the particles by controlled roasting thereof to provide a product composed of a mixture of barium compounds having a pH value approximating 7, and adding to the product an inorganic sulphate inhibitor and which forms an insoluble hydroxide.

7. A barium bentonite inhibitor for bentonite mud which has been base exchanged with soluble barium to form barium bentonite which comprises a relatively insoluble inorganic sulphate of the type which forms an insoluble hydroxide.

8. In the art of purifying an impure barium sulphate ore when the barium sulphate is segregated by a higher fatty acid reagent froth flotation which coats the barium sulphate with the fatty acid, the step of roasting the flotation product in the absence of a flame and in the presence of an excess of oxygen by controlling the temperature and period of roasting, with a view of causing a minimum of decomposition of the barium sulphate to soluble barium compounds at the roasting, and adding to the roasted product an inorganic sulphate in a small proportion to prevent the formation of barium bentonites and to cause the forming of insoluble hydroxide when the product is mixed with a bentonitic water slurry.

9. A bentonitic mud laden fluid for oil or gas wells having a mixture of barium sulphate and inorganic sulphates of the type forming insoluble hydroxides therein.

10. In the art of controlling the boring of oil or gas wells by the circulation of a bentonitic drilling fluid, the steps of compounding with the mud a mix including barium sulphate and an inorganic sulphate material of the type forming insoluble hydroxides.

11. A method of treating barite to prepare it for use as a drilling mud admix comprising the steps of grinding the natural barite, filming the ground particles of barite with a higher fatter acid so as to remove the unfilmed particles of impurities therefrom by froth flotation, calcining the filmed particles of barite to remove the film, and adding an inorganic sulphate of the type forming insoluble hydroxides so as to prevent the formation of barium bentonite when the barite is added to a bentonitic drilling mud.

BENJAMIN S. LINDSEY.

REFERENCES CITED

The following references are of record in the file of this patent:

UNITED STATES PATENTS

| Number | Name | Date |
| --- | --- | --- |
| 1,994,761 | Ennis | Mar. 19, 1935 |
| 2,280,034 | Harrison | Apr. 24, 1942 |
| 2,280,035 | Harrison | Apr. 24, 1942 |

OTHER REFERENCES

"The Cementer," Sept. 1931, pages 4, 5 and 6.

Rankin et al., American Institute of Mining and Metallurgical Engineers, Technical Publication No. 880, March 1938, pages 1 to 13.

Norman et al., American Institute of Mining and Metallurgical Engineers, Technical Publication No. 1326, May 1941, pages 1 to 5.